(12) United States Patent
Ito

(10) Patent No.: US 9,768,656 B2
(45) Date of Patent: Sep. 19, 2017

(54) THREE-PHASE ALTERNATING CURRENT ELECTRIC MOTOR PROVIDED WITH STRUCTURE REDUCING TORQUE RIPPLE

(71) Applicant: FANUC CORPORATION, Yamanashi (JP)

(72) Inventor: Takashi Ito, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 281 days.

(21) Appl. No.: 14/740,525

(22) Filed: Jun. 16, 2015

(65) Prior Publication Data

US 2015/0372552 A1    Dec. 24, 2015

(30) Foreign Application Priority Data

Jun. 18, 2014   (JP) .................. 2014-125680

(51) Int. Cl.
| H02K 3/28 | (2006.01) |
| H02K 19/12 | (2006.01) |
| H02K 3/12 | (2006.01) |
| H02K 19/10 | (2006.01) |
| H02K 21/14 | (2006.01) |

(52) U.S. Cl.
CPC ............... *H02K 3/28* (2013.01); *H02K 3/12* (2013.01); *H02K 19/10* (2013.01); *H02K 19/12* (2013.01); *H02K 21/14* (2013.01); *H02K 2213/03* (2013.01)

(58) Field of Classification Search
CPC .. H02K 3/12–3/16; H02K 3/28; H02K 19/10; H02K 19/12; H02K 2213/03
See application file for complete search history.

(56) References Cited

U.S. PATENT DOCUMENTS

| 5,723,930 A | 3/1998 | Ho et al. |
| 2014/0035400 A1* | 2/2014 | Asano ............... H02K 3/12 |
| | | 310/45 |

FOREIGN PATENT DOCUMENTS

| JP | 7106046 B2 | 11/1995 |
| JP | 823650 A | 1/1996 |
| JP | 2002199680 A | 7/2002 |

(Continued)

OTHER PUBLICATIONS

English Abstract for WO Publication No. 2015128964 A1, published Sep. 3, 2015, 1 pg.

(Continued)

Primary Examiner — Ramon M Barrera
(74) Attorney, Agent, or Firm — Fredrikson & Byron, P.A.

(57) ABSTRACT

A three-phase alternating current electric motor wherein when a number of pole pairs of a rotor is P and a number of slots in which stator windings are inserted is N, N/(6P) becomes an irreducible fraction with a value of a denominator of 4 or more and wherein the relation of N>3P stands, in which the motor, for the layout of one layer of windings arranged in the slots, the UVW three-phases are arranged so as to have rotational symmetry of ±120 degrees in terms of mechanical angle from each other and, for the layout of the second layer, the windings are arranged reversed in direction by 180 degrees in electrical angle from the phases of the first layer of windings which have rotational symmetry and offset by M number of slots from the first layer, where T is a particular odd number for the relationship of $4/35 \leq |T-2PM/N| \leq 8/35$ is given.

7 Claims, 14 Drawing Sheets

(56) References Cited

FOREIGN PATENT DOCUMENTS

| | | |
|---|---|---|
| JP | 2002345191 A | 11/2002 |
| JP | 2004023950 A | 1/2004 |
| JP | 200743775 A | 2/2007 |
| JP | 201155619 A | 3/2011 |
| JP | 201321846 A | 1/2013 |
| WO | 2015128964 A1 | 9/2015 |

OTHER PUBLICATIONS

English Abstract for Japanese Publication No. 2013-021846 A, published Jan. 31, 2013, 1 pg.
English Abstract for Japanese Publication No. 2011-055619 A, published Mar. 17, 2011, 1 pg.
English Abstract for Japanese Publication No. 2007-043775 A, published Feb. 15, 2007, 1 pg.
English Abstract for Japanese Publication No. 2002-345191 A, published Nov. 29, 2002, 1 pg.
English Abstract for Japanese Publication No. 2002-199680 A, published Jul. 12, 2002, 1 pg.
English Abstract for Japanese Publication No. 08-023650 A, published Jan. 23, 1996, 1 pg.
Untranslated Decision to Grant a Patent mailed by Japan Patent Office (JPO) for Application No. JP 2014-125680, Feb. 28, 2017, 3 pages.
English machine translation of Decision to Grant a Patent mailed by JPO for Application No. JP 2014-125680, Feb. 28, 2017, 3 pages.
English Abstract Japanese Publication No. 62-250851 A, published Oct. 31, 1987, 1pg. No English Abstract is available for JP 7-106046 B2, published Nov. 13, 1995; the English Abstract is provided for the A publication. Both JP 62-250851 A and JP 7-106046 B2 are Application No. 61-093824.
English Abstract Japanese Publication No. 2004-023950 published Jan. 22, 2004, 1pg.

* cited by examiner

THREE-PHASE ALTERNATING CURRENT ELECTRIC MOTOR PROVIDED WITH STRUCTURE REDUCING TORQUE RIPPLE

BACKGROUND OF THE INVENTION

1. Field of the Invention

The present invention relates to a three-phase alternating current electric motor which is provided with a structure which reduces torque ripple, more particularly relates to a distributed winding three-phase alternating current electric motor where the different phases of windings are wound distributed in several slots.

2. Description of the Related Art

Electric motors which are provided with permanent magnets suffer from pulsation called "cogging torque" and torque fluctuations called "torque ripple". Cogging torque is a phenomenon where the magnetic attraction force between the armature and rotor in the electric motor finely vibrates depending on the rotation angle and can be confirmed when making the shaft of the electric motor rotate by hand etc. without running a current to the electric motor. The cogging torque changes in magnitude due to the shape of the rotor or stator etc. On the other hand, torque ripple occurs due to the waveform of the induced electromotive force in the electric motor deviating from the ideal waveform. The harmonics of the magnetic flux which is generated from the rotor (or the harmonics of the induced voltage which is generated from that magnetic flux) are the cause. The phenomenon is dependent on the magnitude of the current (torque ripple ∝ harmonics of induced voltage×current). In an electric motor, in particular, there is a tendency for the pulse components, comprising number of pole pairs×6 times vibration for one turn of the rotor, to be large.

As explained above, the torque which is generated from the electric motor has the above-mentioned cogging torque and torque ripple added to it as pulsation. Due to the presence of such pulsation, vibration and noise occur at the apparatus which is driven by the electric motor. In terms of magnitude of pulsation, when the load of the electric motor is small, the cogging torque is dominant, while when the load of the electric motor is large, the torque ripple is dominant. This is because when the load of the electric motor is small, the current for driving the electric motor becomes small, while when the load of the electric motor is large, the current for driving the electric motor becomes large.

The conventional method for reducing torque ripple was to optimize the shape of the core of the rotor or the shape of the core of the stator, the skew by which the magnetic pole boundaries of the core of the rotor were skewed from the axial direction, the skew at the core of the stator etc. However, remodification of an electric motor for optimization requires a more complicated structure of the electric motor and becomes a cause of increasing the manhours in production. Further, torque ripple is dependent on the magnitude of the current, so even if taking measures such as skew, the effect is small when using a relatively large current for a drive operation.

In this regard, in an electric motor, the number of magnetic poles (number of poles), the number of slots which hold the windings, and the layout of the windings in the slots also affect the magnitudes of the cogging torque and the torque ripple. As a combination of the number of poles and number of slots enabling the cogging torque and the torque ripple to be reduced, there is the "fractional slot" configuration where the number of slots divided by the number of poles becomes an irreducible fraction. There are electric motors which employ this fractional slot configuration (for example, see Japanese Patent Publication No. 2004-23950A and Japanese Patent Publication No. 7-106046B2).

In a fractional slot type electric motor, it is possible to select the number of poles and the number of slots so as to increase the least common multiple of the number of poles and the number of slots and possible to reduce the cogging torque and the torque ripple. However, among the harmonic components which are contained in the induced voltage of an electric motor, the relatively lower order ones such as the fifth and seventh harmonics do not completely disappear. The torque ripple, which occurs due to the harmonics of the induced voltage and the current, cannot be sufficiently reduced.

Further, in an electric motor in which the number of slots becomes three times or more the number of pole pairs and where the slots become fractional slots, while the cogging torque and the torque ripple tend to become smaller, the coil pitch of the windings which are inserted into the slots become larger than 1 slot and winding is only possible by distributed winding. In particular, in an electric motor where the value of the number of slots divided by the number of pole pairs, the number of phases, and 2 becomes an irreducible fraction and the value of the denominator becomes 4 or more, the layout of the windings becomes complicated, so lap winding is the general practice. This is not suited for automation of winding at the time of production.

SUMMARY OF INVENTION

In one aspect, the present invention has as its object to provide a fractional slot type electric motor which further reduces the torque ripple and keeps down the number of steps relating to manufacture of the electric motor. Furthermore, if explained in detail, the present invention has as its object the provision of a three-phase alternating current electric motor which reduces the torque ripple by the number of poles, the number of slots, and winding layout and keeps down the number of manufacturing steps.

According to one embodiment of the present invention, there is provided a three-phase alternating current electric motor wherein when a number of pole pairs of a rotor of the electric motor is P and a number of slots in which windings of a stator are inserted is N, N/(6P) becomes an irreducible fraction with a value of a denominator of 4 or more and wherein the relation of N>3P stands, in which three-phase alternating current electric motor, in the slots in which the windings are inserted, any windings of the three phases and their reverse directions for the total six phases are arranged divided into two layers for each slot, among the two layers of windings which are arranged in each slot, for the layout of one layer of windings, U-phase, V-phase, and W-phase three-phase windings are arranged so as to have rotational symmetry of ±120 degrees in terms of mechanical angle from each other and, for the layout of the other layer of windings, the windings are arranged reversed in direction by 180 degrees in electrical angle from the phases of the first layer of windings which have rotational symmetry and offset by M number of slots from the first layer of windings, and the number of pole pairs P, the number of slots N, and a number of slots offset M satisfy the relation $4/35 \le |T-2PM/N| \le 8/35$ where T is a selected value from the odd number for the above described condition to be obtained.

According to a three-phase alternating current electric motor of the present invention, it is possible to realize a reduction in torque ripple by the number of poles, the number of slots, and the winding layout. Further, this is a winding structure which enables automatic winding. Skew of the core at the rotor or stator or other mechanical structures for dealing with pulsation are also not required, so at the time of production as well, the number of production processes can be kept down.

BRIEF DESCRIPTION OF THE DRAWINGS

The present invention will be understood more clearly by referring to the drawings attached below.

DETAILED DESCRIPTION

Figure 1:
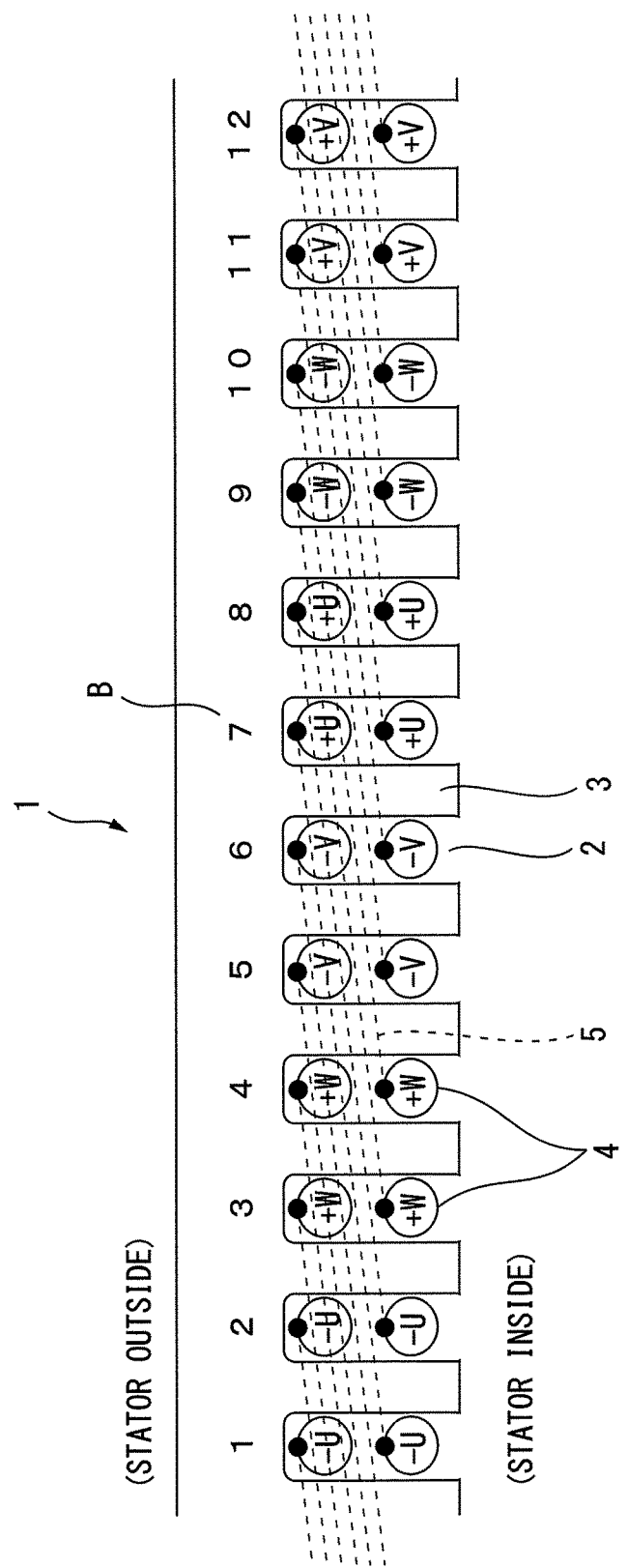
FIG. 1 is a developed cross-sectional view which illustrates part of one example of a six-pole 36-slot winding layout of a conventional electric motor.

Below, referring to the drawings, embodiments of the present invention will be explained in detail based on specific examples. Before explaining embodiments of the present invention, the number of poles and the winding layout in the slots in a conventional electric motor will be explained using FIG. 1 to FIG. 3. Note that, in the following explanation, the slot pitch of the coil at the time of lap winding will be referred to as the "coil pitch".

CONVENTIONAL EXAMPLE 1

FIG. 1 illustrates one example of an integral slot type stator 1 of a conventional alternating current electric motor (Conventional Example 1) and illustrates a 6-pole 36-slot winding layout. The integral slot configuration is the case where (number of slots)÷(number of poles) becomes a whole number (in the example which is illustrated in FIG. 1, 36÷6=6). The stator 1 is originally a cylindrical shape, but to facilitate the explanation here, the cylindrical shape stator 1 is illustrated as a developed cross-section which is opened up linearly. Further, in the subsequent conventional examples and examples of the present invention as well, in the explanation of the layout of the windings 4 at the stator 1, this developed cross-sectional view will be used to explain the layout of the stator 1 and windings 4. Note that, FIG. 1 illustrates the cross-section of part of the developed stator 1 (12 slots worth).

Further, the alternating current is a three-phase alternating current, the windings 4 are arranged at two slots each for each phase, a two-layer winding layout is employed, and both layers are full pitch windings of distributed windings. The number B at the top side of each slot 2 is the slot identification number. FIG. 1 illustrates the +U-phase winding, +V-phase winding, and +W-phase winding and the −U-phase winding, −V-phase winding, and −W-phase winding. The "+" and "−" illustrate the energization directions. If defining "+" as the direction of flow of current from the front side to the back side of the figure, "−" is the direction of flow of current from the back side to the front side of the figure. In terms of electrical angle, the phase of the current differs by 180 degrees.

Conventional Example 1 which is illustrated in FIG. 1 has 36 slots, so one slot angle is 10 degrees and there is a 6 slot coil pitch. Therefore, the coil pitch, converted to electrical angle, becomes slot angle 10 degrees×6 slots×number of pole pairs 3=180 degrees. In Conventional Example 1 which is illustrated in FIG. 1, in each slot 2, the windings 4 are made lap windings (two-layer windings). The other windings of the windings (coils) 4 at the time of lap winding are illustrated by the lines which are illustrated by the reference notations 5 and are at positions separated by 180 degrees in terms of electrical angle. For example, the other winding of the winding 4 (+W-phase winding) which is lap wound in the slot 2 with a slot identification number B of 4 is the winding (−W-phase winding) 4 of the first layer with a slot identification number B of 10.

CONVENTIONAL EXAMPLE 2

Figure 2:
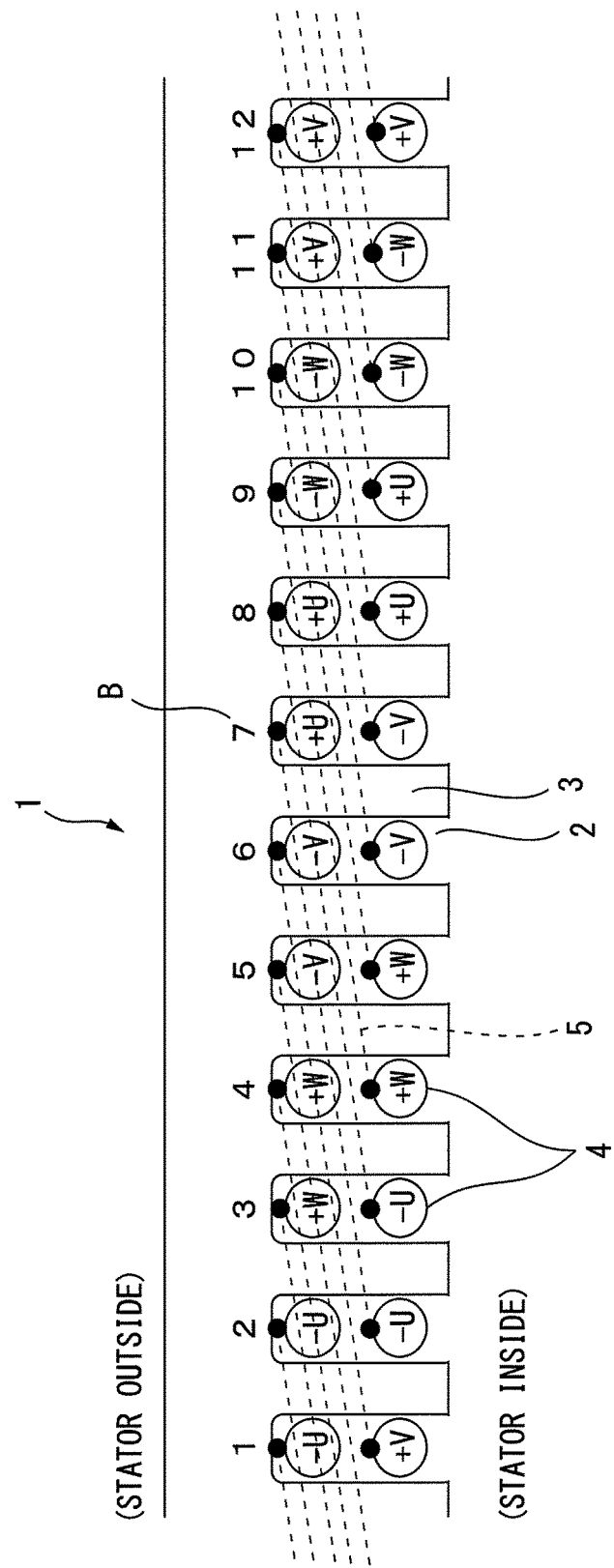
FIG. 2 is a developed cross-sectional view which illustrates part of another example of a six-pole 36-slot winding layout of a conventional electric motor.

FIG. 2 illustrates another example of an integral slot type stator 1 of a conventional alternating current electric motor (Conventional Example 2) and illustrates a 6-pole 36-slot winding layout. FIG. 2 also illustrates part of the stator 1 (12 slots worth). The winding layout of Conventional Example 2 differs from the winding layout of Conventional Example 1 in the point that the winding of the second layer of each phase of the two-layer winding is offset by 1 slot to the right side. For this reason, the other winding of the winding 4 at the time of lap winding, as illustrated by the line illustrated by the notation 5, becomes a position separated by (180 degrees×⅚) in terms of electrical angle. In the Conventional Example which is illustrated in FIG. 2, there is a 5 slot coil pitch, so the coil pitch becomes 150 degrees converted to electrical angle.

Short Pitch Winding of Distributed Winding

In Conventional Example 2 which is illustrated in FIG. 2, compared with the layout of Conventional Example 1 which is illustrated in FIG. 1, the torque is somewhat reduced, but the torque ripple is reduced. However, in the case of an integral slot type electric motor, (number of poles:number of slots)=(1:3n) (n is a natural number). The least common multiple of the number of poles and the number of slots matches the number of slots, so to increase the least common multiple, it is necessary to increase the number of slots. In this regard, the number of slots cannot be made that large manufacturing wise, so the torque ripple which is due to the least common multiple easily becomes large in amplitude and low in order. Therefore, the effect of short pitch winding is somewhat small.

CONVENTIONAL EXAMPLE 3

Figure 3:
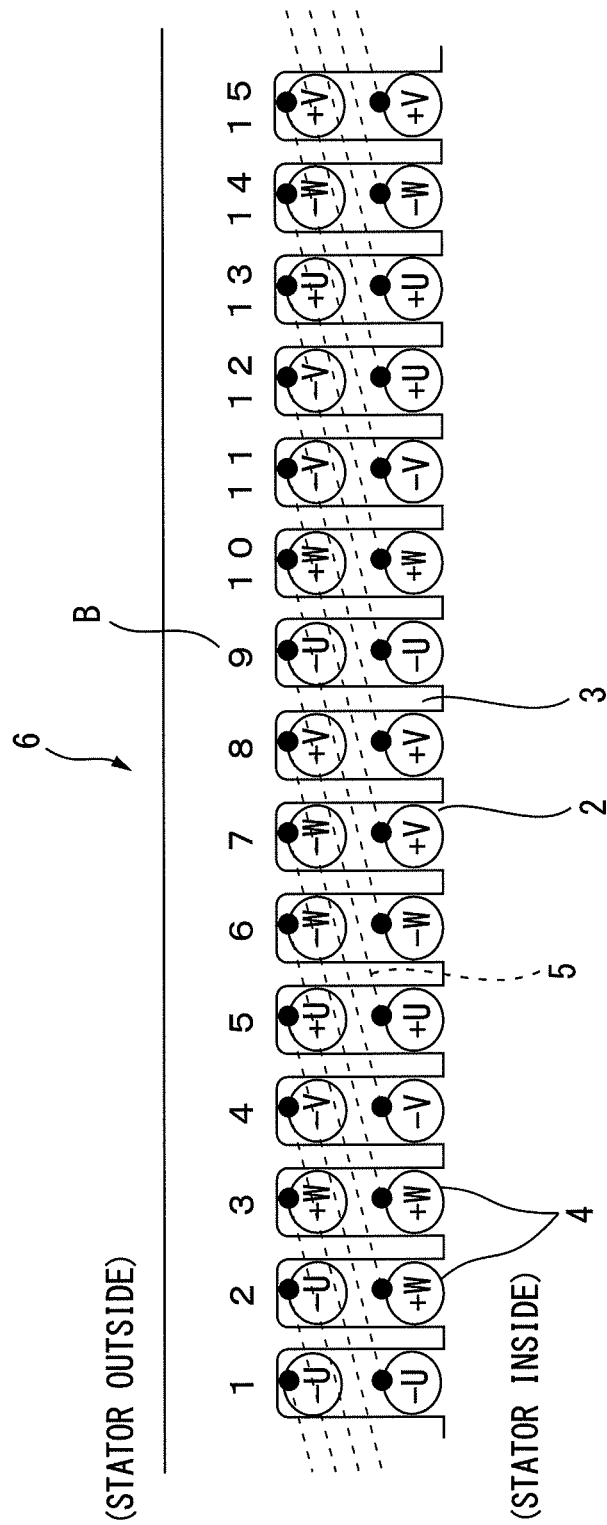
FIG. 3 is a developed cross-sectional view which illustrates one example of a four-pole 15-slot winding layout of a conventional electric motor.

FIG. 3 illustrates still another example of a fractional slot type stator 6 of a conventional alternating current electric motor (Conventional Example 3) and illustrates a known 4-pole 15-slot winding layout. Two phases are arranged in one slot (two-layer winding). The number of slots occupied by the different phases becomes somewhat uneven. Conventional Example 3 is the case where (number of slots)÷(number of poles)÷(number of phases) becomes 15÷4÷3=5/4 or an irreducible fraction with a denominator of 4 or more. Further, the other winding at the time of lap winding is at a position which is offset by several slots between the first layer and the second layer. Two slots are positioned separated from each other by about 180 degrees in terms of electrical angle.

In Conventional Example 3, there is a 4 slot coil pitch. The center angle between the slots is 192 degrees converted to electrical angle thereby giving a long pitch winding. Note that, the method of obtaining the coil pitch of lap winding at a fractional slot configuration differs from that at an integral slot configuration. It is not possible to adopt a layout of full pitch winding (coil pitch is 180 degrees in terms of electrical angle). There is no reference publication particularly defining the coil pitch of a fractional slot configuration. It had been considered sufficient to employ a value close to 180 degrees in terms of electrical angle.

In Conventional Example 3, the least common multiple of the number of poles and the number of slots of the 4-pole 15-slot layout is 60, so the amplitude of the pulse components which vibrate by exactly the amount of the least common multiple for each turn of the rotor becomes smaller. In integral slot type electric motors of the same number of poles, to realize this least common multiple, 60 slots become necessary. In terms of being able to obtain a large least common multiple by a smaller number of slots, a fractional slot type electric motor is more advantageous than a integral slot type electric motor. However, the pulse components comprised of number of pole pairs×6 times of vibration per turn of the rotor could not be greatly reduced. Therefore, reducing the pulse components was an issue in the fractional slot type stator 6 which is illustrated in Conventional Example 3.

Figure 4:
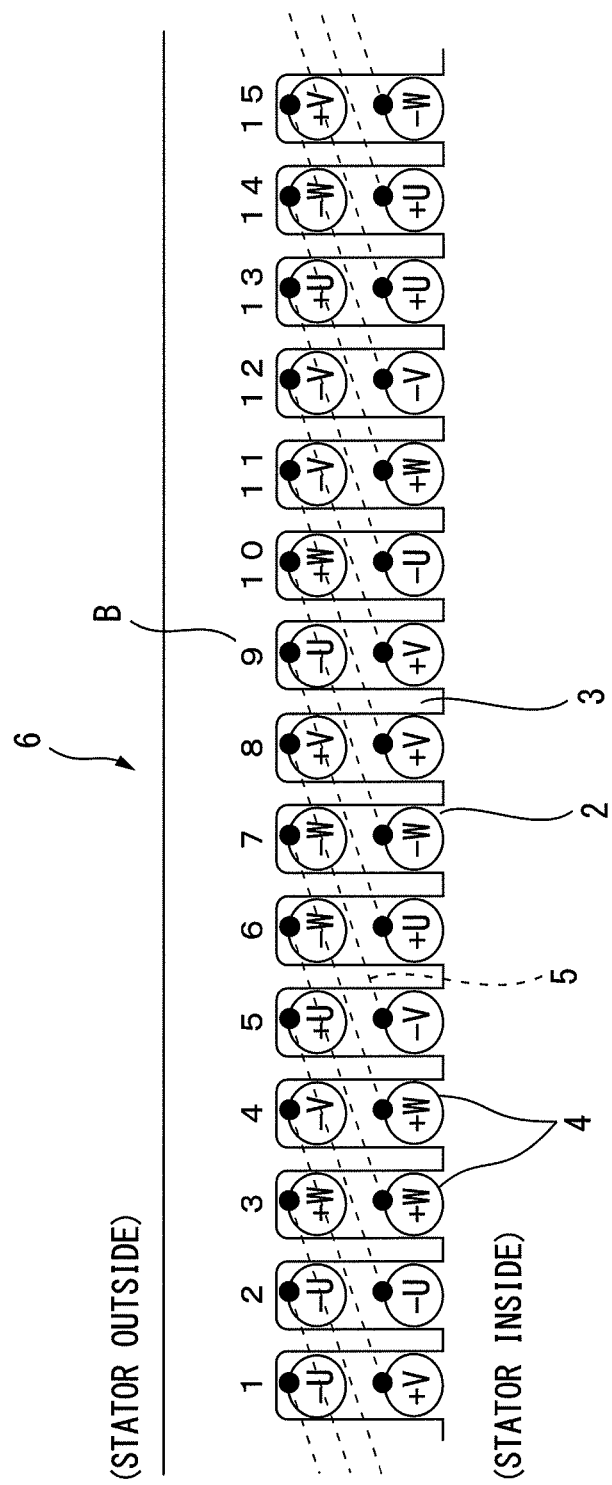
FIG. 4 is a developed cross-sectional view which illustrates a four-pole 15-slot winding layout of an electric motor of the present invention.

FIG. 4 illustrates short pitch winding of the fractional slot configuration in the first embodiment of the present invention and illustrates the winding layout in a 4-pole 15-slot stator 6. Two phases are arranged for one slot 2 (two-layer winding). The other winding at the time of lap winding is at a position which is separated by an electric angle of 180 degrees×⅘ as illustrated by the notation 5. In the first embodiment, there is a 3 slot coil pitch. The center angle between the slots is 144 degrees converted to an electrical angle.

Here, the method of layout of the windings at the 4-pole 15-slot stator 6 which is illustrated in FIG. 4 will be explained using FIG. 5 to FIG. 7.

Figure 5:
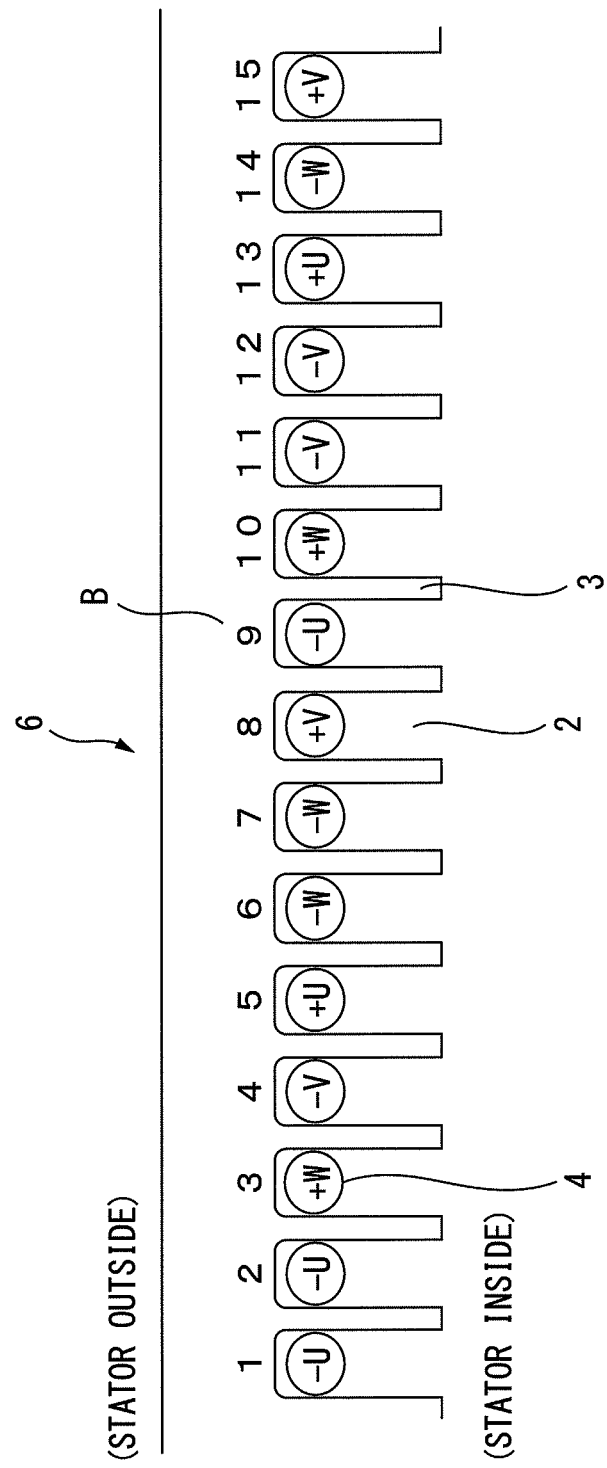
FIG. 5 is a developed cross-sectional view which illustrates a U-phase, V-phase, and W-phase winding layout at a first layer in the slots in the four-pole 15-slot winding layout which is illustrated in FIG. 4.

FIG. 5 illustrates the state of layout of the U-phase, V-phase, and W-phase windings at the first layer of the slots 2 of the 15-slot stator 6. The order of the three phases of the U-phase, V-phase, and W-phase is not particularly limited, but the phases having rotational symmetry of ±120 degrees from each other by mechanical angle is a condition of the first layer. If making the layout of the U-phase winding rotate by a mechanical angle of ±120 degrees, either the W-phase winding or the V-phase winding will overlap. Further, if satisfying this condition, for example, there may also be empty layers or empty slots where no windings are inserted. The case where there are empty layer slots or empty slots etc. will be explained later. In FIG. 5, if the layout of the U-phase winding is offset to the left by 5 slots (in terms of mechanical angle: 120 degrees), it will overlap with the V-phase winding layout, while if it is offset to the right by 5 slots, it will overlap with the W-phase winding.

Figure 6:
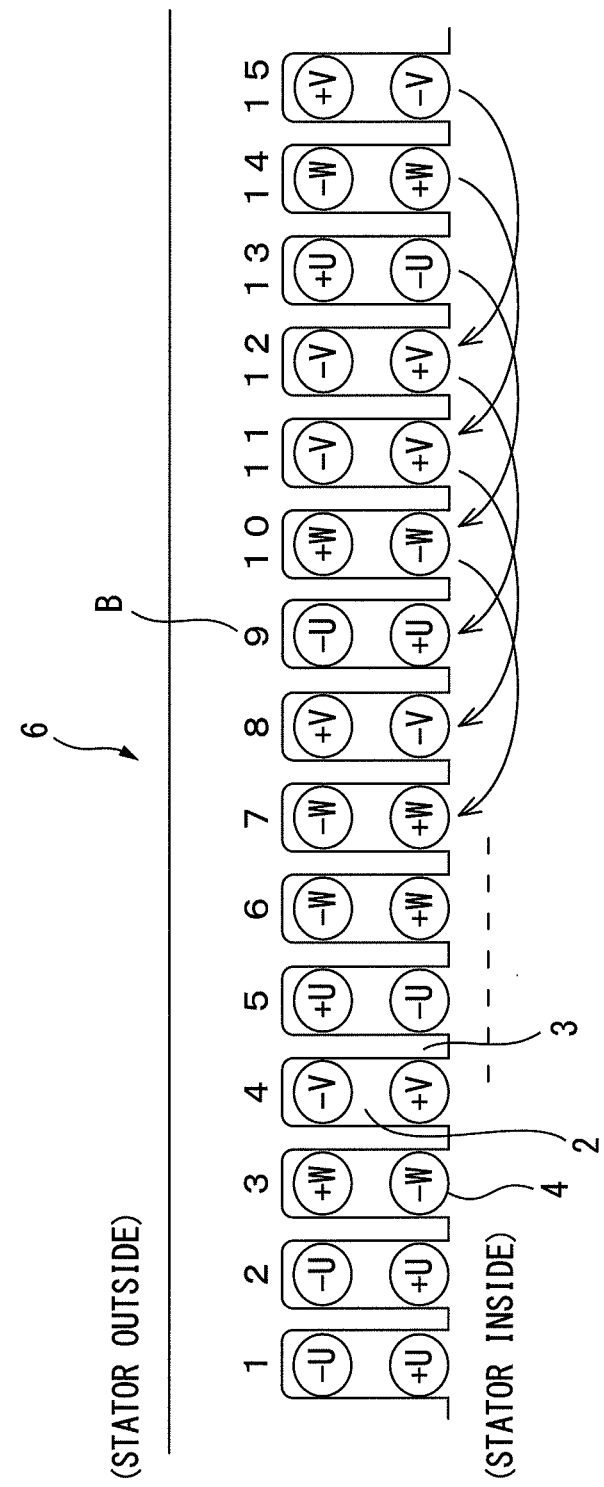
FIG. 6 is a developed cross-sectional view which illustrates a winding layout of a first embodiment which lays out phases of reverse directions from the U-phase, V-phase, and W-phase winding of the first layer at a second layer in the slots in the four-pole 15-slot winding layout which is illustrated in FIG. 5.
Figure 7:
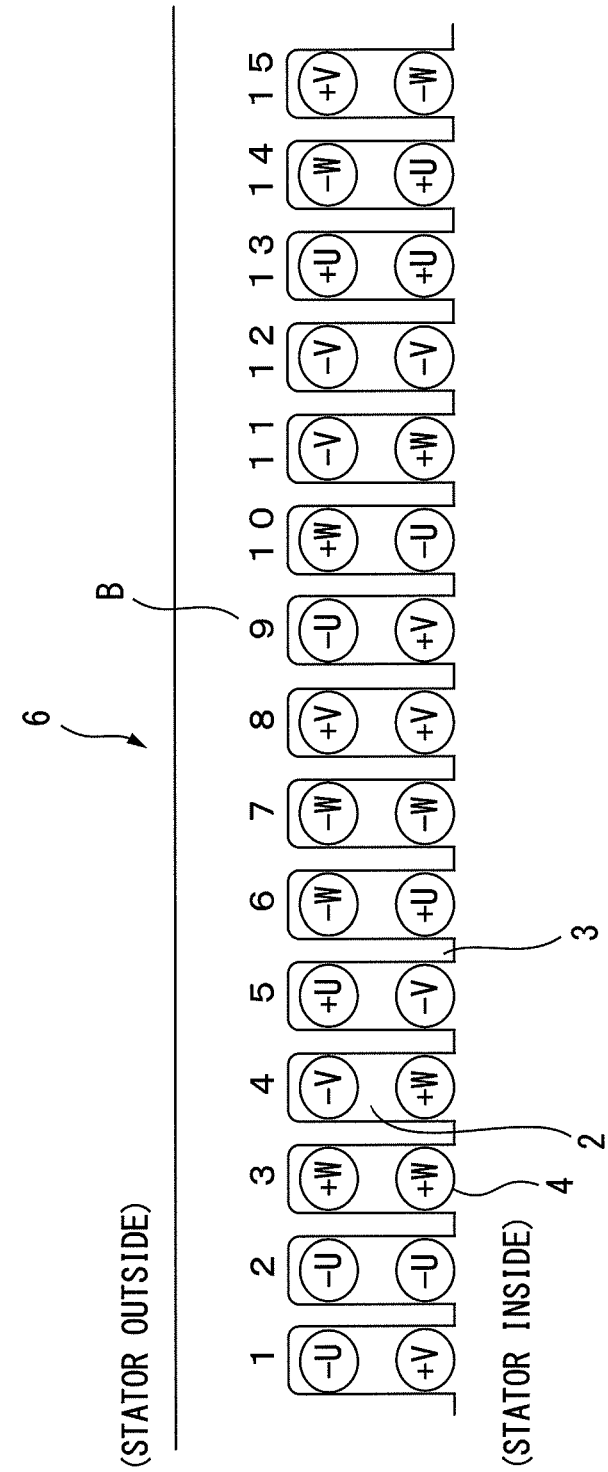
FIG. 7 is a developed cross-sectional view which illustrates a winding layout of an embodiment in which the layout of windings of the second layer in the slots in the four-pole 15-slot winding layout which is illustrated in FIG. 6 is offset by three slots to the left and illustrates the state becoming the same layout as FIG. 4.

At the second layer, as illustrated in FIG. 6, the same phase windings of reverse directions where the directions of energization become reverse to the first layer are arranged. For example, when the winding of the first layer in a certain slot 2 is a U-phase winding (−U), the winding of the second layer of this slot 2 is made a U-phase reverse direction winding (+U). Similarly, for a V-phase winding (−V), a reverse direction V-phase winding (+V) is arranged, while for a W-phase winding (−W), a reverse direction W-phase winding (+W) is arranged. The same is true when the windings of the first layer are the U-phase winding (+U), V-phase winding (+V), and W-phase winding (+W). At the second layer, a U-phase winding (−U), V-phase winding (−V), and W-phase winding (−W) are arranged.

Finally, the windings which are arranged at the second layer are arranged offset by M number of slots (M is a whole number) from the state which is illustrated in FIG. 6. For example, the windings which are arranged at the second layer are arranged offset to the left by 3 slots from the state which is illustrated in FIG. 6. If performing this operation to offset all of the windings of the second layer, the result becomes the winding layout such as illustrated in FIG. 7. This becomes the same as the winding layout which is illustrated in FIG. 4.

Here, when making the number of pole pairs of the rotor of the electric motor P, making the number of slots 2 in which windings are inserted of the stator 6 N, and furthermore making the number of slots of offset of the second layer from the first layer M and investigating combinations enabling reduction of the torque ripple, it was learned that theoretically the value of the following formula is important:

$$Q=|T-2\times P\times M\div N| \qquad (1)$$

where T is a selected value from the odd number for this formula 1 to satisfy conditions to be hereinafter described. From theoretical considerations, it is learned that when this formula 1 satisfies $4/35 \le Q \le 8/35$, torque ripple of the electric motor is reduced and the performance of the electric motor is improved. Further, from magnetic analysis based on the theoretical considerations as well, when Q of formula 1 satisfies $4/35 \le Q \le 8/35$, torque ripple of the electric motor is reduced and the performance of the electric motor is improved. This magnetic analysis will be explained later.

The magnitude of an induced voltage of an electric motor is affected by the coil pitch of the windings which are wound in the slots of the stator. It is known that the short pitch coefficient which is expressed by the following formula is one of the important factors:

$$Ks = |\sin(n\pi\beta/2)| \tag{2}$$

The induced voltage which is generated at the stator of the electric motor becomes greater when the interlinkage flux which is generated at the windings and the flux which is generated from the rotor become synchronized in phase. Depending on the positions of the slots of the windings, the two become easy to synchronize or become difficult to synchronize. This affects the magnitude of the induced voltage. Formula 2 calculates the rate of reduction of the induced voltage due to the coil pitch.

In formula 2, "n" is the order of the waveform of the induced voltage which is generated at the electric motor, while $\beta$ is the ratio of the pole pitch and coil pitch. Ks takes a value from 0 to 1. When n=1, the torque becomes larger the closer to 1. When other than n=1, Ks represents the rate of reduction of the harmonics of the induced voltage. The closer to 0, the smaller the harmonics which occur. In the harmonics of the induced voltage of the electric motor, the even number order waveforms are difficult to generate due to the symmetry of the N-pole and S-pole of the rotor. Further, regarding the third order, sixth order, ninth order, and other order of waveforms of multiples of three, when the connection of the three phases is a star connection, the waveforms of the three phases cancel each other out, so the effect is small. What are particularly important are the lower orders in the remaining harmonics such as the fifth and seventh orders. When n=5 and n=7, the rate of reduction Ks of the harmonics of the induced voltage is preferably close to 0.

In this regard, the pole pitch is determined by the number of pole pairs P. Further, in the case of lap winding, the coil pitch is determined in value by the number of slots N and the number of slots offset M. If finding the relationship with $\beta$ at this time, $\beta=2PM/N$. That is, by suitably selecting P, N, and M, it is possible to manipulate the value of formula 2. Further, regarding Q of formula 1, the relationship of $Q=|T-\beta|$ stands. Formula 2 is a periodic function, so the range of the value of $\beta$ where a predetermined characteristic is obtained becomes periodic. Therefore, even when the value of $\beta$ is large, a particular odd number T is used to define the formula of Q so that a solution is obtained. If the solution is not obtained when P,N and M are defined and T is selected from any odd number, this invention cannot be applied.

From theoretical considerations, it is learned that when Q of formula 1 satisfies $1/7 \le Q \le 1/5$, the value of Ks when n=1 remains near 1 while the values of the two Ks when n=5 and n=7 can be reduced. Further, it is learned that even when doubling the range of Q and when Q of formula 1 satisfies $4/35 \le Q \le 8/35$, the value of Ks when n=1 remains near 1 while the value of Ks of either n=5 or n=7 or both can be reduced.

In the layout of windings in the electric motor of the first embodiment which is illustrated in FIGS. 4, P=2, N=15, M=3, and T=1. Here, if applying these values to formula 1, Q=0.2. Since the Q of formula 1 falls in the range of $4/35 \le Q \le 8/35$, the electric motor of the first embodiment of the present invention is reduced in torque ripple and the performance of the electric motor is improved.

Note that, in the electric motor of the Conventional Example 3 which is illustrated in FIGS. 3, P=2, N=15, and M=4. If applying these numerical values to formula 1, any odd number T is selected as, Q will not fall in the range of $4/35 \le Q \le 8/35$. Accordingly, in the winding layout in the electric motor of the Conventional Example 3 which is illustrated in FIG. 3, the torque ripple is not reduced and the performance of the electric motor is not improved.

Figure 8:
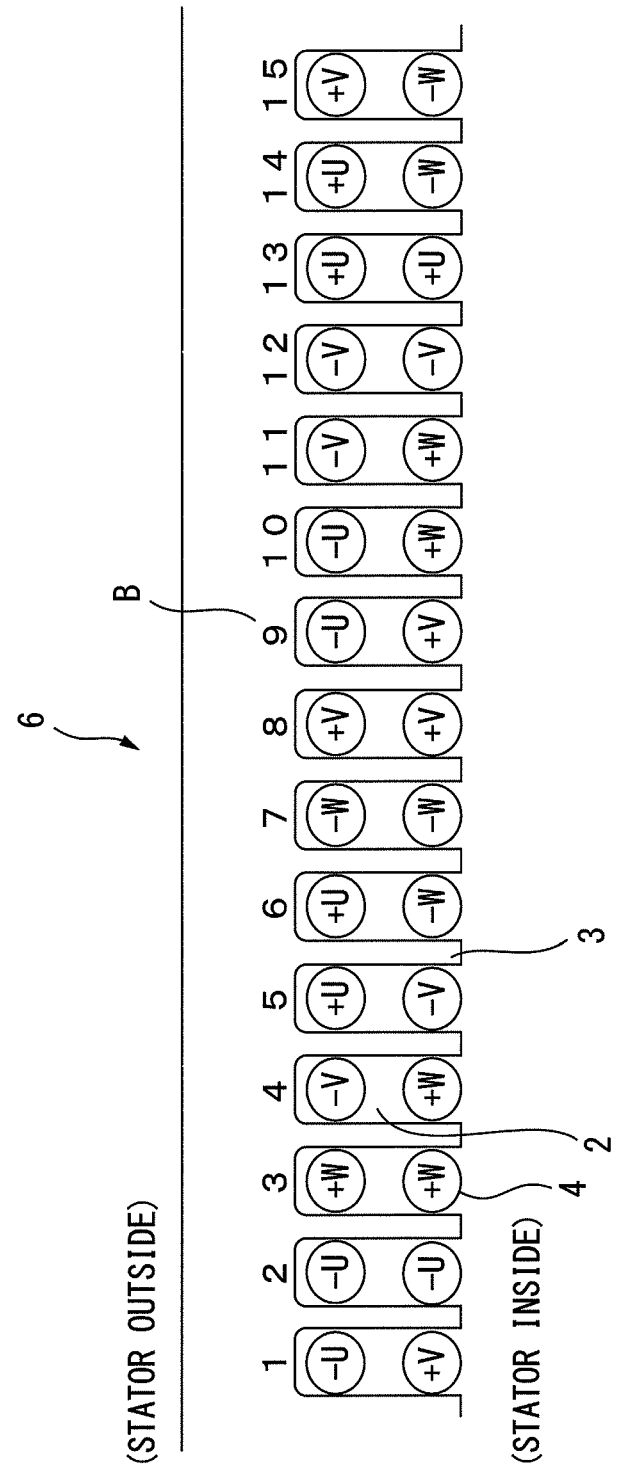
FIG. 8 is a developed cross-sectional view which illustrates a winding layout of a second embodiment in which the layout of windings of the first layer and the second layer in the 4-pole 15-slot winding layout which is illustrated in FIG. 7 is rearranged to an order of the U-phase winding, V-phase winding, and W-phase winding from the outside of the stator.

FIG. 8 illustrates short pitch winding of the fractional slot configuration in a second embodiment of the present invention and illustrates the winding layout in a 4-pole 15-slot stator 6. This winding layout is a two-layer winding where two phases are arranged at each slot 2. The second embodiment switches the phases in the slots 2 of the first embodiment which is illustrated in FIG. 7.

In the first embodiment, the first layer and the second layer in each slot 2 were arranged so as to become lap windings in winding method. On the other hand, in the second embodiment, the first layer of windings and the second layer of windings in each slot 2 are rearranged to the order of the U-phase winding, V-phase winding, and W-phase winding from the outside of the stator 6.

For example, when using an inserter type automatic winding machine for inserting windings into the slots of the stator 6, changing the different phase windings like with lap winding and laying out the windings in the inserter takes an extremely large number of production steps. That is, when inserting windings into the slots of the stator 6 by using an automatic winding machine, laying out a specific phase of winding among the three phases of windings in order one phase at a time is efficient in terms of number of manufacturing steps. In the second embodiment which is illustrated in FIG. 8, compared with the first embodiment which is illustrated in FIG. 7, the first layers and second layers of the slots 2 with the slot identification numbers B of 6, 10, and 14 are arranged switched.

In FIG. 3 to FIG. 8, the winding layouts of a 4-pole 15-slot configuration fractional slot type electric motor were illustrated, but in electric motors which are generally used in industrial machines and machine tools, the number of poles is usually six poles, eight poles, or 10 poles. This is because if the number of poles of the electric motor is too small, the length of the circumference of the rotor per pole becomes long, the waveform of the magnetic flux which is generated from the rotor deviates from a sine wave waveform and easily becomes a trapezoidal shape, and the pulsation of the torque becomes larger. Further, conversely, if the number of poles is too large, this leads to an increase in the manufacturing processes. For this reason, in electric motors which are generally used in industrial machinery and machine tools, ones with numbers of poles of six poles, eight poles, and 10 poles tend to be selected.

Here, among electric motors with numbers of poles of six poles, eight poles, and 10 poles, if mentioning as an example the case where (number of slots)÷(number of poles)÷(number of phases) becomes an irreducible fraction and the value of the denominator of the irreducible fraction becomes 4 or more, among the configurations where the numbers of slots do not become that large, there are an 8-pole 30-slot configuration, 10-pole 18-slot configuration, 10-pole 36-slot configuration, etc. Further, in an 8-pole 30-slot configuration, the (number of poles):(number of slots) is the same as the 4-pole 15-slot configuration which is illustrated in FIG. 4, so it is sufficient to cyclically arrange 15-slots worth of windings doubled to obtain a 30-slot configuration.

Figure 9:
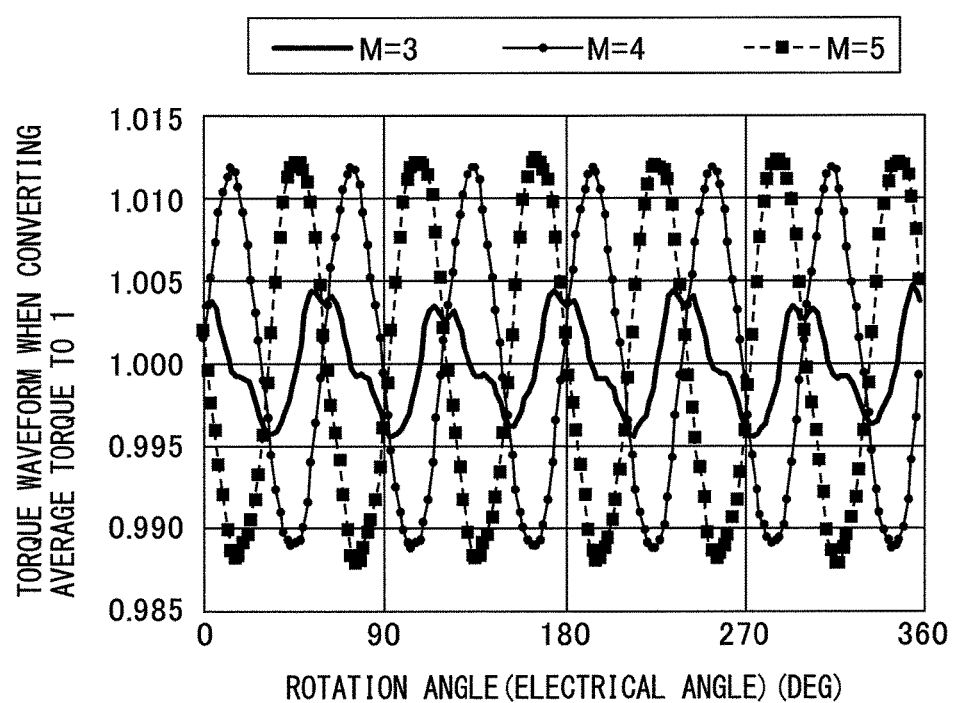
FIG. 9 is a waveform diagram which illustrates the results of FEM magnetic analysis when changing the number of offsets of slots of the windings at the second layer in the slots in the electric motor which has an 8-pole 30-slot IPM rotor to 3, 4, and 5.

FIG. 9 illustrates the results of magnetic analysis by the finite element method (FEM) of an 8-pole 30-slot (P=4, N=30) IPM electric motor (interior permanent magnet type electric motor) and illustrates the grounds for formula 1. Here, the value of M of the 8-pole 30-slot (P=4, N=30) IPM electric motor was changed to 3, 4, and 5 for conducting comparative tests. The value of Q in the above-mentioned formula 1 falls within the range of $4/35 \leq Q \leq 8/35$ when the value of M is 3 if entering T=1. When the value of M is 4 and when the value of M is 5, any odd number is entered for T, Q does not satisfy the condition of $4/35 \leq Q \leq 8/35$. As a result, it was learned that only when M=3 is the relationship of $4/35 \leq Q \leq 8/35$ satisfied.

Further, in the case where M=3, Q also falls in the range of $1/7 \leq Q \leq 1/5$, so pulsation can be further reduced. If actually entering $\beta=2PM/N=4/5$ into formula 2 and finding the values of Ks when n=1, n=5, and n=7, the values respectively become 0.951, 0, and 0.587. The Ks of n=1 remains a value close to 1. The values in the case of n=5 and n=7 can be made smaller.

As illustrated in FIG. 9, an 8-pole 30-slot (P=4, N=30) configuration IPM electric motor was magnetically analyzed while changing the value of M to 3, 4, and 5. As a result, at each of the waveforms of M=3, M=4, and M=5, six pulse components at electrical angles of 360 degrees can be confirmed. Further, as a result of this magnetic analysis, it is learned that the torque ripple when M=3 becomes smaller than the torque ripples when M=4 and M=5.

Figure 10:
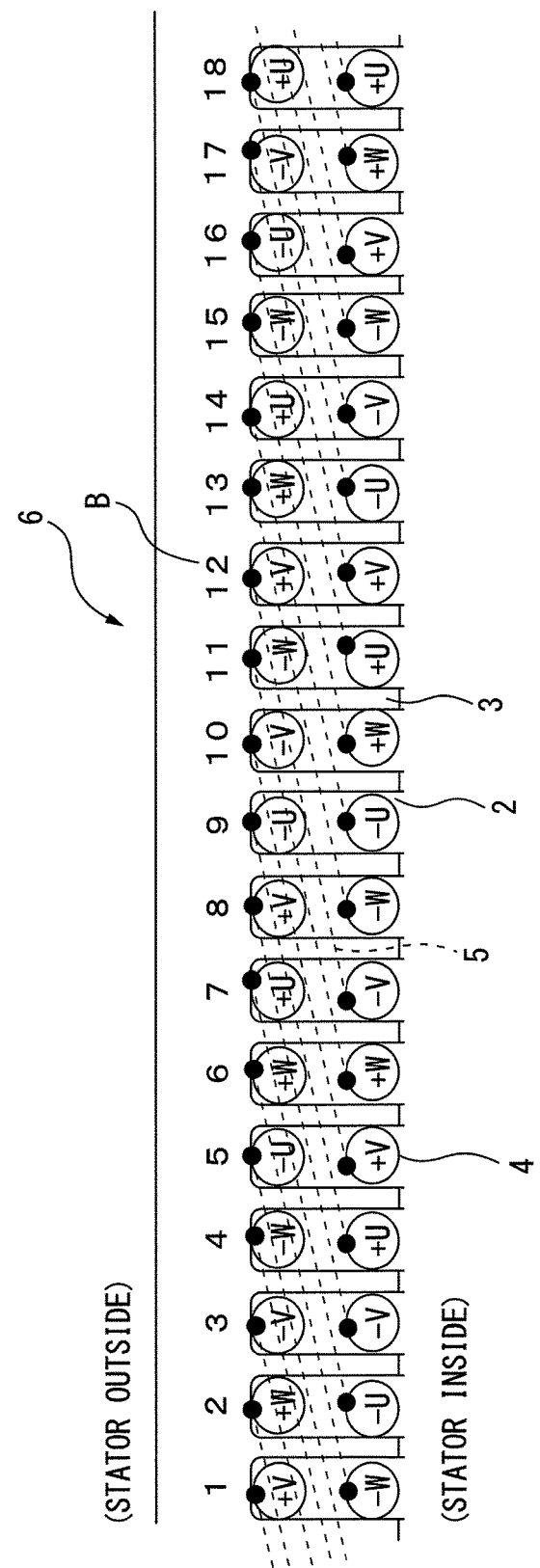
FIG. 10 is a developed cross-sectional view which illustrates a 10-pole 18-slot winding layout of an electric motor of the present invention.

FIG. 10 is one example which illustrates the layout of the windings in the electric motor of a third embodiment of the present invention in the above-mentioned 10-pole 18-slot configuration and illustrates the case where P=5, N=18, and M=5. In the third embodiment, if making T=3, the value of Q in formula 1 satisfies $4/35 \leq Q \leq 8/35$, the torque ripple of the electric motor is reduced, and the performance of the electric motor is improved. If actually entering $\beta=2PM/N=25/9$ into formula 2 and finding the values of Ks at the times of n=1, n=5, and n=7, the values become respectively 0.939, 0.173, and 0.766. The Ks of n=1 remains a value close to 1. When n=7, the reduction of Ks is not that great, but the value in the case of n=5 can be made smaller.

Figure 11:
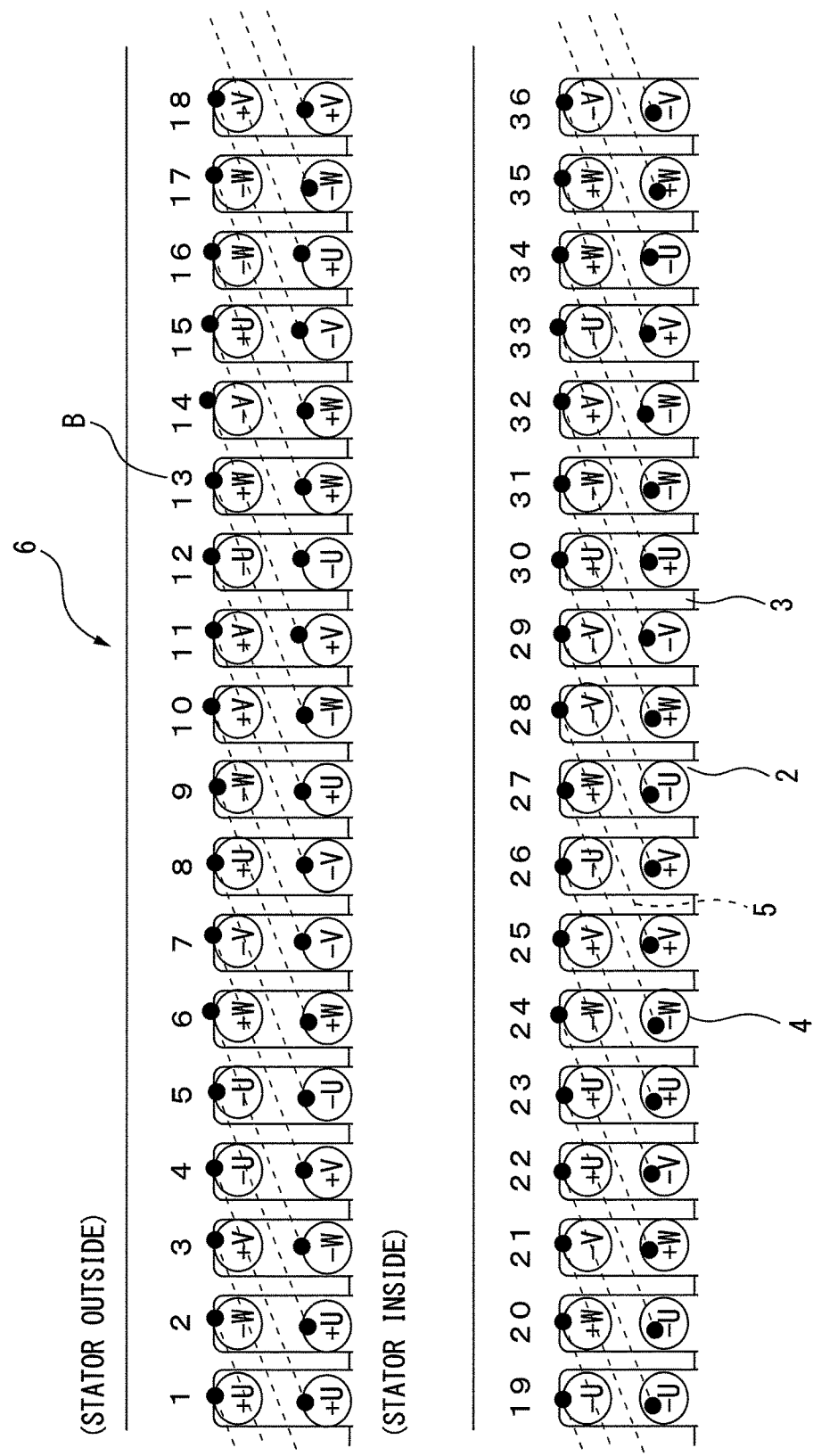
FIG. 11 is a developed cross-sectional view which illustrates a 10-pole 36-slot winding layout of an electric motor of the first embodiment of the present invention.

FIG. 11 is one example which illustrates the layout of the windings in the electric motor of the first embodiment of the present invention in the above-mentioned 10-pole 36-slot configuration and illustrates the case where P=5 and N=36. Here, if making M=3 and T=1, the value of Q in formula 1 becomes 1/6, so $1/7 \leq Q \leq 1/5$ is satisfied and the torque ripple of the electric motor is reduced. If actually entering $\beta=2PM/N=5/6$ into formula 2 and finding the values of Ks at the times of n=1, n=5, and n=7, the values of Ks become respectively 0.965, 0.258, and 0.258. The Ks of n=1 remains a value close to 1, while the values in the cases of n=5 and n=7 can be made smaller.

Figure 12:
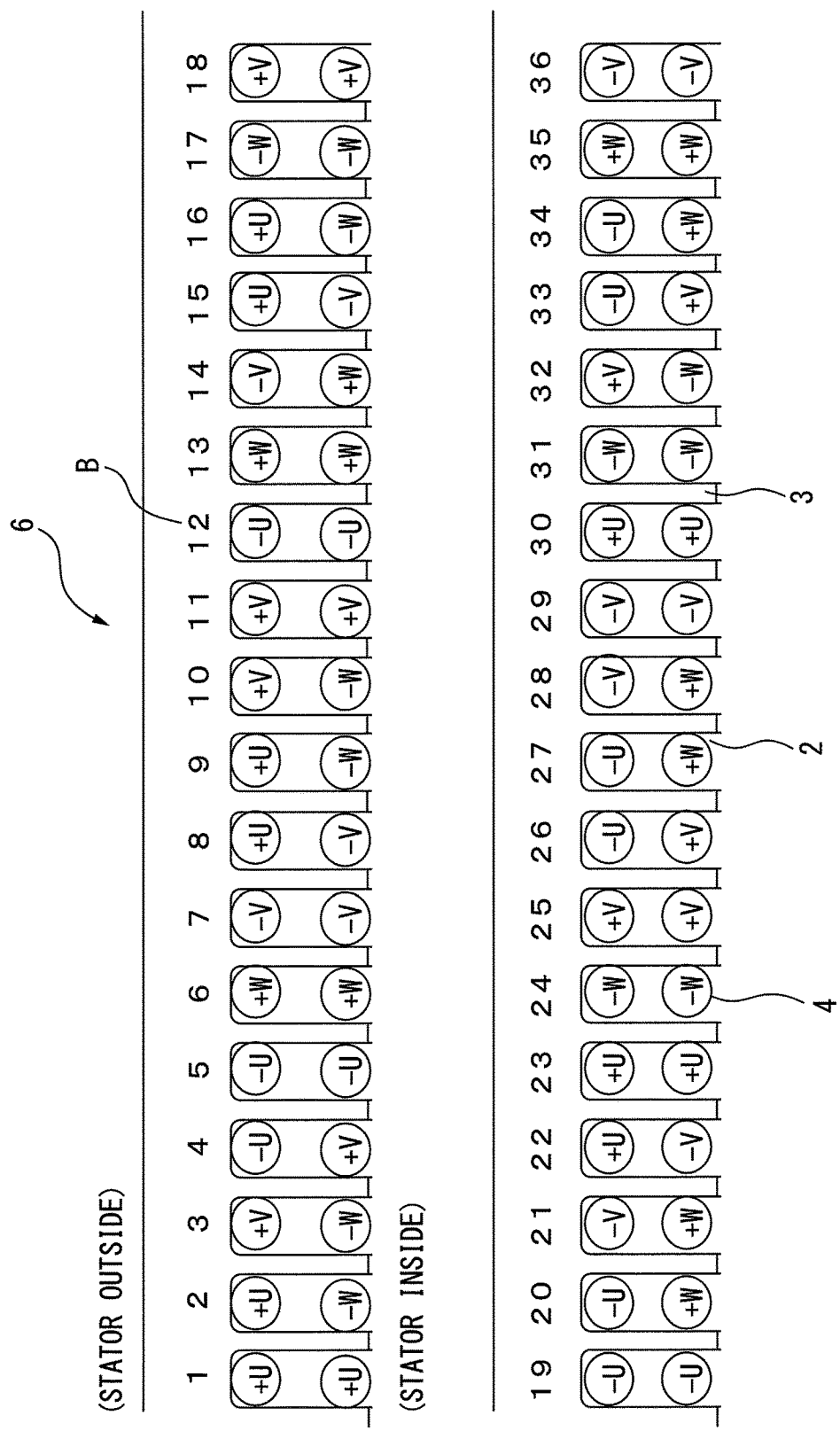
FIG. 12 is a developed cross-sectional view which illustrates a 10-pole 36-slot winding layout of an electric motor of a second embodiment of the present invention.

FIG. 12 illustrates one example of the layout of windings in the electric motor of the second embodiment of the present invention in a 10-pole 36-slot configuration. In this example, the winding layout of the slot identification numbers B of FIGS. 11 of 2, 9, 16, 20, 27, and 34 are switched and the windings in the slots are rearranged in order to the U-phase winding, V-phase winding, and W-phase winding from the outside of the stator 6.

Figure 13:
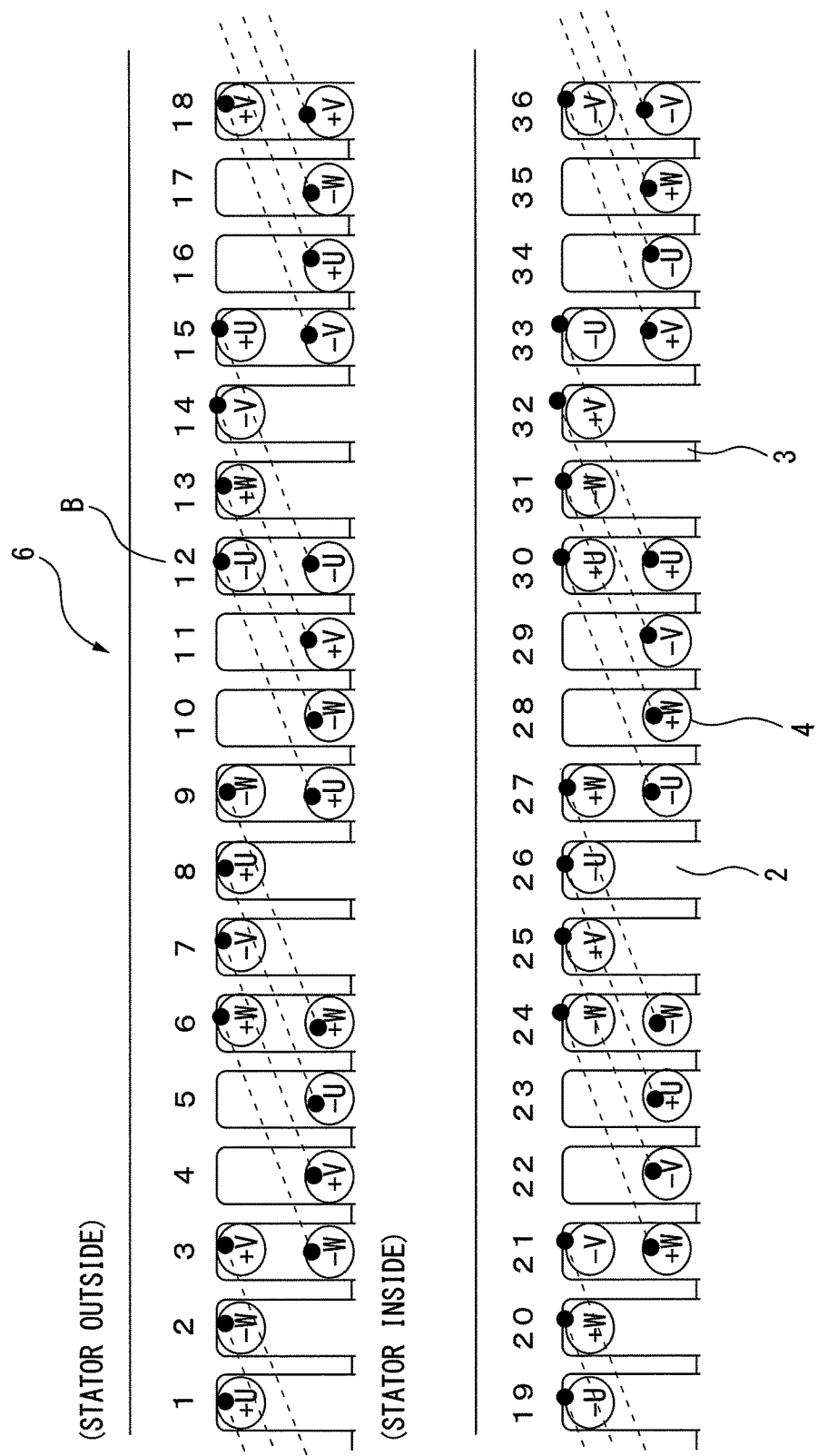
FIG. 13 is a developed cross-sectional view which illustrates a 10-pole 36-slot winding layout of an electric motor of the first embodiment of the present invention in the case where the winding layout has slots with empty layers.

FIG. 13 illustrates the example of the electric motor of the first embodiment of the present invention in a 10-pole 36-slot configuration, but having empty layers. In this example, there are two types of slots: slots with single-layer windings and slots with two-layer windings. The example is illustrated where the total numbers of windings of the slots differ. If defining the top side of each slot of FIG. 13 as the first layer and the bottom side as the second layer, the first layer has UVW-phase windings arranged at mechanical angles of 120 degrees with each other and having rotational symmetry and satisfies the condition of the first layer which was explained in FIG. 5.

For example, at the first layer where the slot identification number B of FIG. 13 is 15, a +U winding is arranged, but at the first layer where the slot identification number B offset by 12 slots in the right direction is 27, a +W winding is arranged while at the first layer where the slot identification number B offset by 12 slots in the left direction is 3, a +V winding is arranged. The slot angle of 36 slots is 10 degrees, so these windings are separated by mechanical angles of ±120 degrees. There is similar rotational symmetry for the first layer windings in other slots as well. Further, regarding the second layer, in relation to the first layer, the windings are arranged so that the number of slots offset M becomes 3. If making T=1, the value of Q in formula 1 becomes 1/6 or satisfies $1/7 \leq Q \leq 1/5$, so compared with when selecting another number of slots offset, the torque ripple of the electric motor is reduced.

Figure 14:
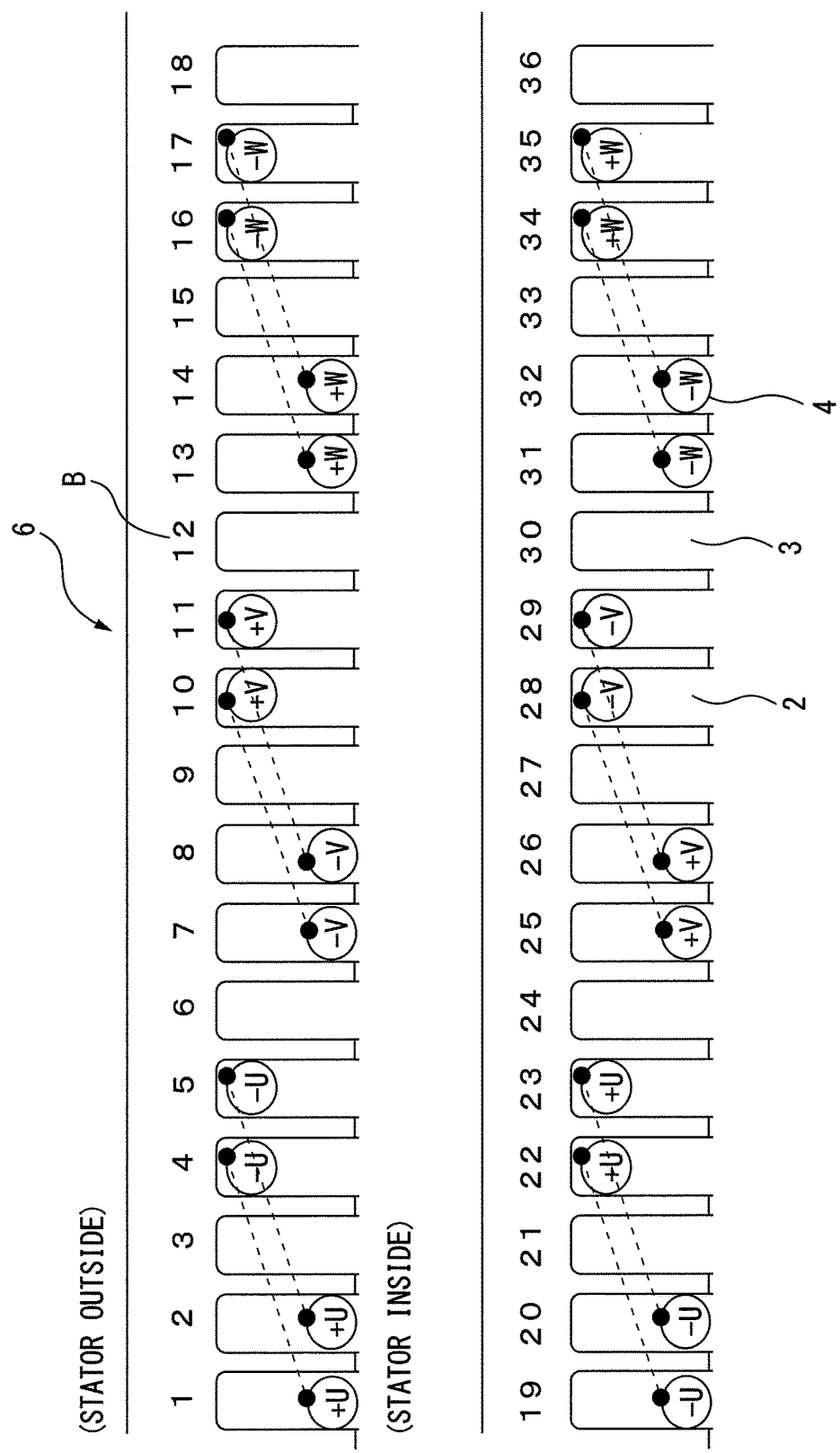
FIG. 14 is a developed cross-sectional view which illustrates a 10-pole 36-slot winding layout of an electric motor of the first embodiment of the present invention in the case where the winding layout has empty slots.

FIG. 14 illustrates one example of the case of the electric motor of the first embodiment of the present invention in a 10-pole 36-slot configuration but having empty slots. If defining the top side of each slot which is illustrated in FIG. 14 as the first layer and the bottom side as the second layer, the first layer has UVW-phase windings arranged at mechanical angles of 120 degrees with each other and having rotational symmetry and satisfies the condition of the first layer which was explained in FIG. 5. For example, at the slots 22 and 23 of FIG. 14, +U windings are arranged, but at the first layer with the slot identification numbers B of 34 and 35 offset 12 slots in the right direction, +W windings are arranged, while at the first layer with slot identification numbers B of 10 and 11 offset 12 slots in the left direction, +V windings are arranged.

The slot angles of the 36 slots are 10 degrees, so these windings have rotational symmetry of ±120 degrees in terms of mechanical angle. Further, the other UVW-phase windings also have similar rotational symmetry. Further, regarding the second layer, in relation to the first layer, the windings are arranged so that the number of slots offset M becomes 3. If T=1, the value of Q in formula 1 becomes 1/6 and $1/7 \leq Q \leq 1/5$ is satisfied, so compared with when selecting another number of slots offset, the torque ripple of the electric motor is reduced.

In this way, the present invention provides a distributed winding electric motor in which the value of the number of slots divided by the number of poles is an irreducible fraction and the value of the denominator of the irreducible fraction is 4 or more, wherein each slot is divided into two layers, the windings are arranged at the first layers of the slots in three phases and their reverse directions for a total of six phases and the slots of the different phases are arranged so as to have rotational symmetry by a mechanical angle of ±120 degrees, while the windings are arranged at the second layer reversed in direction by an electrical angle of 180 degrees from the phases of the first layer and are arranged offset by M number of slots from the first layer. Further, when entering the number of slots N, the number of pole pairs P, and the number of slots M offset in the windings of the second layer M into formula 1, the relationship of $4/35 \leq Q \leq 8/35$ is made to stand.

As a result, when harmonics of the spatial magnetic flux which is present between the rotor and stator act on the windings at each slot of the stator and generate harmonics of the induced voltage, the phases become offset at each winding of the slots and as a result it is possible to reduce the harmonics of the induced voltage. Due to this, it is possible to reduce the torque ripple.

Above, the present invention was explained with reference to preferred embodiments, but a person skilled in the art would understand that various modifications and changes can be made without departing from the scope of the later explained claims.

What is claimed is:

1. A three-phase alternating current electric motor comprising:
   a rotor and
   a stator having a number of slots wherein
   when a number of pole pairs of said rotor is P and a number of slots in which windings of said stator are inserted is N, N/(6P) becomes an irreducible fraction with a value of a denominator of 4 or more and wherein the relation of N>3P stands, in which three-phase alternating current electric motor, in the slots in which the windings are inserted, any windings of the three phases and their reverse directions for the total six phases are arranged divided into two layers for each slot, among the two layers of windings which are arranged in each slot, for the layout of one layer of windings, U-phase, V-phase, and W-phase three-phase windings are arranged so as to have rotational symmetry of ±120 degrees in terms of mechanical angle from each other and, for the layout of the other layer of windings, the windings are arranged reversed in direction by 180 degrees in electrical angle from the phases of the first layer of windings which have rotational symmetry and offset by M number of slots from the first layer of windings, and
   said number of pole pairs P, said number of slots N, and a number of slots offset M satisfy the following relation where T is a selected value from an odd number for the following relationship to be obtained:
   $4/35 \leq |T-2PM/N| \leq 8/35$.

2. The three-phase alternating current electric motor according to claim 1, wherein in the slots of the stator of said electric motor, the order of insertion of the three phases of the U-phase, V-phase, and W-phase and the positions of the U-phase, V-phase, and W-phase in the slots are not differentiated between the first layer and the second layer.

3. The three-phase alternating current electric motor according to claim 2, wherein the layout of the U-phase, V-phase, and W-phase windings in the slots of the stator of said electric motor include empty layers and empty slots.

4. The three-phase alternating current electric motor according to claim 2, wherein in said electric motor, said number of pole pairs P, said number of slots N, and said number of slots offset M satisfy the following relation where T is a selected value from an odd number for the following relationship to be obtained:
   $1/7 \leq |T-2PM/N| \leq 1/5$.

5. The three-phase alternating current electric motor according to claim 2, wherein in said electric motor, said number of pole pairs P=5, said number of slots N=18, said number of slots offset M=5, and T=3.

6. The three-phase alternating current electric motor according to claim 4, wherein in said electric motor, said number of pole pairs P=4, said number of slots N=30, said number of slots offset M=3, and T=1.

7. The three-phase alternating current electric motor according to claim 4, wherein in said electric motor, said number of pole pairs P=5, said number of slots N=36, said number of slots offset M=3, and T=1.

\* \* \* \* \*